(No Model.) 2 Sheets—Sheet 1.
J. DIETZ.
AUTOMATIC GRAIN MEASURER.
No. 455,744. Patented July 14, 1891.
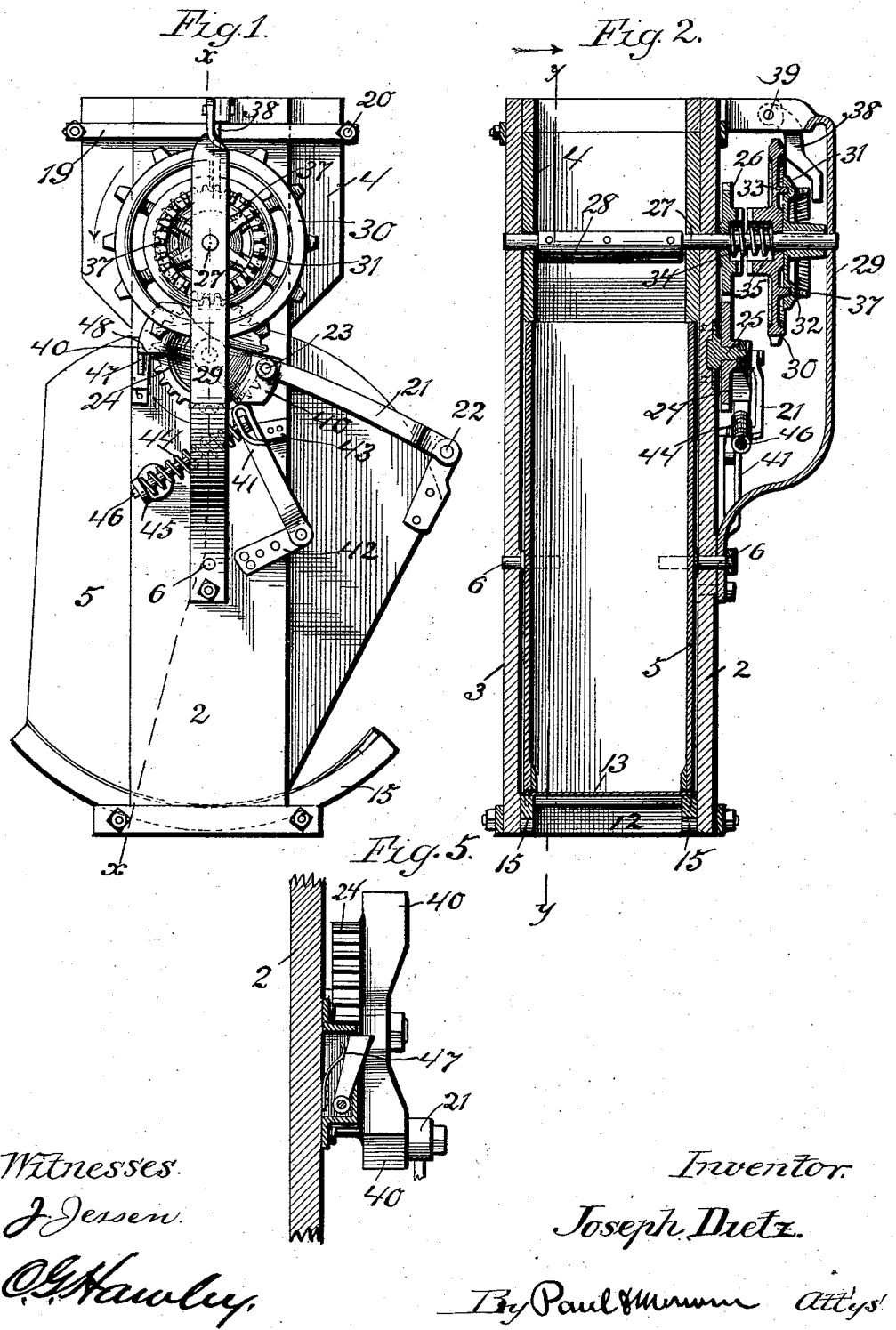
Witnesses
J. Jensen
O. G. Hawley
Inventor
Joseph Dietz.
By Paul & Munn Att'ys (No Model.) 2 Sheets—Sheet 2.

J. DIETZ.
AUTOMATIC GRAIN MEASURER.

No. 455,744. Patented July 14, 1891.

Witnesses
J. Jessen
O. E. Hawley

Inventor
Joseph Dietz
By Paul & Merwin Attys

UNITED STATES PATENT OFFICE.

JOSEPH DIETZ, OF OWATONNA, MINNESOTA.

AUTOMATIC GRAIN-MEASURER.

SPECIFICATION forming part of Letters Patent No. 455,744, dated July 14, 1891.

Application filed August 24, 1889. Serial No. 321,912. (No model.)

*To all whom it may concern:*

Be it known that I, JOSEPH DIETZ, of Owatonna, in the county of Steele and State of Minnesota, have invented a certain Improved Automatic Grain-Measuring Machine, of which the following is a full, clear, and exact specification.

My invention relates to automatic grain-measuring machines of the class embodying a tilting or oscillating measuring-hopper, and relates especially to simple and durable means for gaging the supply of grain to said hopper and for properly tilting the same.

The object of the invention is to provide a grain-measure adapted to be attached to a thrashing-machine, grain-cleaner, or elevator to accurately measure the stock discharged therefrom, and which may be easily kept in order and cheaply constructed.

My invention consists, generally, in the combination, with a duplicate compartment and tilting measuring-hopper open at top and bottom, of stationary floors or wings adapted to close the lower ends of said compartments, an opening arranged between the same for the discharge of the grain, a feed-hopper through which the grain is delivered to one compartment at a time, a shaft extending through said feed-hopper and provided with a tripping paddle or plate adapted to work therein, a fixed disk on the end of said shaft, a power-wheel arranged on said shaft and adapted to engage said disk, means for holding the same normally in engagement, a loose gear on said shaft arranged to be engaged by said power-wheel when thrown out of engagement with said disk by the stoppage of the tripping-plate, and a gear meshing therewith and connected with said tilting hopper by a pivoted link, whereby as each compartment is filled the lower end thereof is moved over the discharge-opening and the other compartment carried into position to be filled.

My invention consists, further, in constructions and in combinations hereinafter described, and particularly pointed out in the claims.

My invention will be more readily understood by reference to the accompanying drawings, in which—

Figure 3:
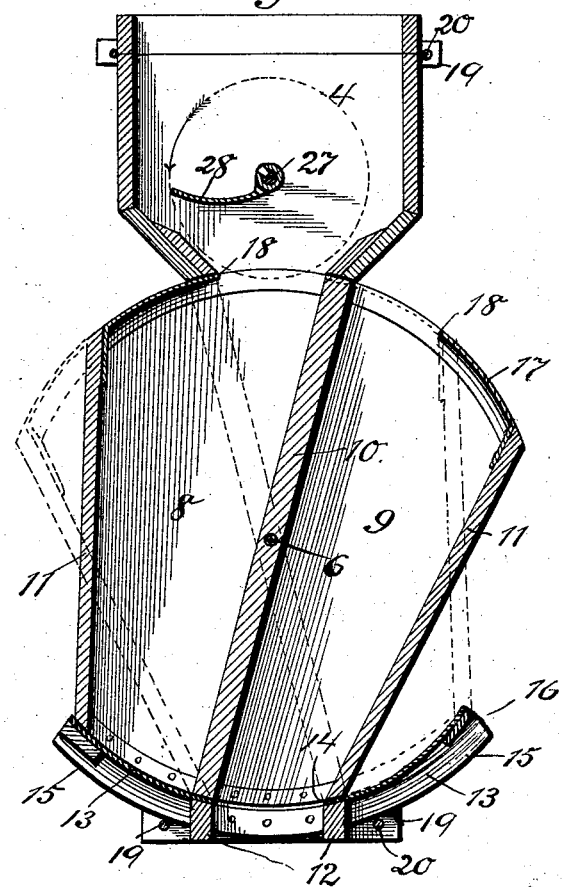
Figure 4:
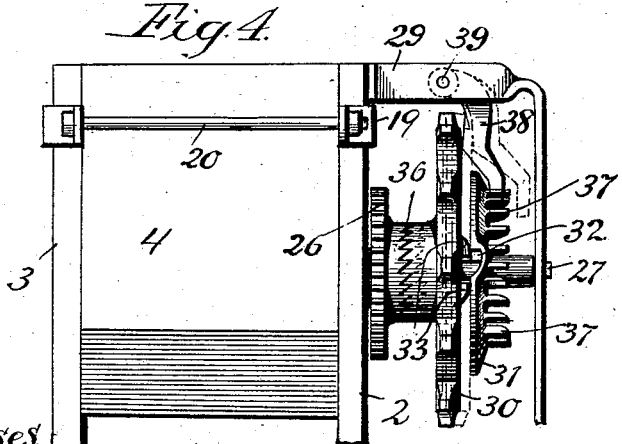

Figure 1 is a front elevation of an automatic measuring-machine embodying my invention. Fig. 2 is a longitudinal cross-section thereof on the line *x x* of Fig. 1. Fig. 3 is a lateral cross-section on the line *y y* of Fig. 2. Fig. 4 is a partial side view of my machine, showing the shaft and the devices thereon. Fig. 5 is a detail view of the second gear or crank wheel and a stop therefor.

As shown in the drawings, the whole mechanism is supported by the front and rear frame-pieces 2 and 3, secured together at top and bottom. The feed-hopper is arranged in the top of the frame. The tilting hopper is loosely pivoted between the same by trunnions 6, having suitable bearings in or on the frame-pieces. The forms of the tilting and feed hoppers are shown most clearly in Fig. 3. The tilting hopper 5 is made up of two compartments 8 and 9, of equal capacity, arranged on each side of the strong central partition 10. The sides 11 are inclined with respect to the middle partition 10, and the lower end of each compartment is entirely free and open so far as the movable hopper is concerned. The compartment-hopper is arranged to tilt so as to bring the bottom discharge-openings of compartments 8 and 9 alternately into coincidence with the opening between the bars 12, extending longitudinally between the frame-pieces. The bottom of the tilting hopper is formed in an arc struck from the trunnions 6 as a center. The wings or floors 13 coincide therewith and are arranged to tightly close the two discharge-openings in the bottom of the tilting hopper alternately, as indicated in Fig. 3. The inner edges 14 of these wings are secured upon the top of the bars 12. The outer edges rest loosely upon the curved brackets 15, and the outer ends of the spring-wings are stiffened by cross-bars 16, as shown. The wings are preferably made of metal having considerable spring or elasticity, so that they press closely against the bottoms of the compartments, thereby completely shutting off any discharge or leakage of stock while a compartment is being filled. Half-caps 17 are provided across the tops of the compartments, as shown in Fig. 3. The opening in the bottom of the feed-hopper 4 is of substantially the same width as the openings between the top of the central partition 10 and the inner edges 18 of said caps, which close in the rest of the top of the tilting hopper 5. Thus it will be seen that the compartments while being filled are entirely closed across top and bottom, except directly beneath the discharge-opening of the feed-hopper. I provide clamp-plates and rods 19 and 20 for clamping together and making more rigid the top and bottom of the machine.

The automatic tilting mechanism is shown most clearly in Figs. 1 and 2. The link 21 extends from a fixed pivot 22 on the tilting hopper to a crank-pin 23, provided on the crank gear-wheel 24. This gear-wheel is loosely secured on the stationary stud 25 and meshes with the loose gear 26, provided on the shaft 27, passing longitudinally through the feed-hopper 4. The tripping-paddle 28 is securely fixed upon the shaft 27 within the feed-hopper and extends wholly or partially across the same. As shown by the dotted lines in Fig. 3, indicating the travel of the outer edges of this curved paddle, the same is adapted to dip slightly into the mouth or top of the compartment being filled. The forward end of the shaft 27 has a bearing in the bracket-strap 29, secured upon the face 2 of the machine. The power-wheel 30 is preferably in the form of a sprocket adapted to be driven by the ordinary link-chain belt extending from any convenient power-shaft. The disk 31 is permanently keyed or otherwise secured upon the shaft 27, and is provided with indentations or notches 32, adapted to admit a lug or lugs 33, provided on the face of the power-wheel 30, as shown clearly in Fig. 4. The abrupt faces or shoulders of the lugs and notches 33 and 32 engage to rotate the disk 31 and therewith the shaft 27 and the tripping paddle or plate 28. The power-wheel is normally held firmly against the disk 31 by the coiled spring 34, arranged in interior openings 35 of the gear and power wheel hubs, Fig. 2. The ends of these hubs are notched, as shown at 36 in Fig. 4, and the prongs or teeth of the one engage those of the other when the sprocket 30 is forced away from the disk 31, which occurs when the paddle is stopped by grain piled up in the top of the hopper-compartment. At this time the disk 31 is suddenly stopped, and, the power-wheel being driven constantly, the lugs are forced out on the inclined sides of the notches 32, thereby thrusting the power-wheel back on the shaft 27 and into engagement with the gear 26, thereby causing the same to rotate. The friction between the lugs 33 and the plane inner face of the disk 31 is so great as to tend to rotate the disk. I therefore provide the outwardly-extending teeth or lugs 37 on the face of the disk, and in connection therewith a gravity-pawl 38, pivoted at 39 upon the bracket 29 and adapted to drop between two of the disk-teeth when the power-sprocket moves back to allow the pawl to drop. By this device the disk is held until the power and gear wheels 30, 26, and 24 have moved through a half-revolution to tilt the measuring-hopper. At the end of the half-revolution the lugs 33 drop back into the two notches 32, arranged diametrically opposite one another in the face of the disk, thereby allowing the power-wheel to move away from the gear 26 and again setting the paddle in rotation. It will be seen that a half-revolution of the crank-wheel 24 carries the tilting hopper over into its opposite extreme position, as indicated by dotted lines in Fig. 3. The grain in compartment 8 will be let out through the opening between the bars 12 of the curved floor and the compartment 9 carried into position to be filled.

In order to prevent any inaccurate or retrograde movement of the crank-wheel 24, I provide the extensions or buffers 40 on the crank-wheel, the forward and outer faces of the same being adapted to engage the free end of the yielding arm 41, pivoted on the block 42, secured to the board 2. This arm is normally held against the stop 43 and projection 40 by the coiled spring 44 acting against the block 45 and held in place by the loose stem 46, as shown most clearly in Fig. 1. In addition to this a spring 47, Figs. 1 and 5, is arranged to yield inwardly as the extensions are rotated past the same and to spring back and engage the under edge 48 just as the crank-wheel stops, thereby preventing backward movement of the same from any cause.

In actual use my measurer is arranged beneath a spout adapted to discharge the stock to be measured into the feed-hopper 4. The adjustment of the mechanism is such that the compartments must either be wholly closed or open to the entrance of grain, it being impossible for the tilting hopper to stop in a half-way position, owing to the accurate government of the same by the gravity-pawl, the buffer-arm, and the spring-catch 47. Assume that the tilting hopper is in the position shown in Fig. 3, in which case the compartment 8 will be in position to receive the grain from the feed-hopper. As the grain fills up to the opening or mouth of the hopper the tripping-paddle 28, dipping down into the same, is choked, thereby suddenly stopping the shaft 27 and the disk 31, whereupon the lugs on the power-wheel are forcibly withdrawn from the disk-notches and forced back onto the face of the disk, whereupon the gravity-pawl, being no longer held out by the rim of the power-wheel 30, drops between the lugs 37 and prevents further movement of the disk-shaft or paddle. The power-wheel, being thus forced back, engages the loose gear 26 and drives the same and the crank-wheel through a half-revolution, thereby tilting the hopper to discharge the grain from compartment 8 and carry the compartment 9 under the feed-hopper. The compartment 9 being filled, the reverse operation takes place, and the compartment 8 is again in readiness to receive grain. The grain discharged through the opening between the stationary floor or wings falls into a suitable receptacle. Ordinarily a tally adapted to be operated by the oscillating movement of the hopper is connected therewith, and, the capacity of the compartments being accurately gaged, the actual quantity of stock passing through the machine may be accurately determined.

It is obvious that my machine may be employed for measuring any stock made up of small particles or pieces.

Having thus described my invention, I claim as new and desire to secure by Letters Patent—

1. The combination, in a device of the class described, of a pivoted measuring-hopper having duplicate compartments arranged upon the sides of the central partition 10, with the slanting sides 11, the lower end of said partition and sides entering the same arc, a feed-hopper arranged above said pivoted hopper, stationary curved and elastic floors or wings adapted to close the lower ends of said compartments, and a discharge-opening arranged between said wings, whereby when the lower end of the compartment is opened for the discharge of the contents thereof the other compartment is prepared to be filled, substantially as described.

2. The combination, in a device of the class described, of a centrally-pivoted compartment-hopper having a central partition 10 and sides 11, with the half-caps 17, partially closing the tops of said compartments of said hopper, feed-hopper 4, elastic floors or wings adapted to close the lower ends of said compartments, a discharge-opening arranged between the same, and means for tilting the hopper, substantially as described.

3. The combination, with the tilting hopper centrally pivoted and having the compartments 8 and 9, with the spring floors or wings arranged on the curved brackets 15 and adapted to close the lower ends of said compartments, substantially as described.

4. The combination, in a device of the class described, of the feed-hopper 4, with a tilting hopper arranged beneath the same and having compartments 8 and 9, a shaft 27, a tripping-paddle arranged thereon and adapted to be stopped by grain in the top of the tilting hopper, a disk 31, arranged on the end of said shaft 27, a power-wheel loosely provided thereon and adapted to engage said disk, a crank-wheel, a pivotal link 21, connecting the tilting hopper and said crank-wheel, and means whereby, said paddle being obstructed, said power-wheel is thrown out of engagement with said disk to operate said crank-wheel and tilt the measuring-hopper, substantially as described.

5. The combination, with the tilting hopper having the central partition 10 and the inclined sides 11, of the elastic or spring floors 13, bars 12, forming the sides of the discharge-opening, the feed-hopper 4, having a suitable discharge-opening, the caps 17, the trunnions 6 for said tilting hopper, a shaft 27, the paddle 28, arranged thereon and within the hopper 4, the disk 31, secured on said shaft, a power-wheel 30 and the gear 26, loosely arranged on said shaft, notches provided in said disk, lugs on said power-wheel adapted to enter the same, a spring 34 for normally holding the same in engagement, the crank-wheel 24, engaging said gear 26, the link 21, pivotally connecting the tilting hopper, and means of engagement between said power and gear wheels 30 and 26, respectively, substantially as and for the purpose specified.

6. The combination, in a device of the class described, of tilting and feed hoppers with the shaft 27, the paddle 28, the fixed disk 31 on said shaft and provided with notches 32, the power-sprocket 30, having lugs 33, adapted to engage the same, the spring for holding the same in engagement, the loose gear 26, a clutch arranged between the same and said sprocket, a crank-wheel meshing with said gear 26, the pivotal link 21, arranged as described, and the gravity-pawl 38, adapted to engage lugs 37 on said disk, substantially as described.

7. The combination, in a device of the class described, of the tilting and feed hoppers with a supporting-frame therefor, the shaft 27, a tripping-paddle arranged thereon, the fixed disk provided with notches 32, the sprocket 30, having lugs 33 adapted to engage said disk, the gear-wheels 24 and 26, the clutch-teeth arranged on the wheels 26 and 30, the spring 34, the extensions 40 on the gear 24, the link 21, pivoted thereon and on the tilting hopper, the yielding buffer 41, adapted to engage said extensions, and the gravity dog or pawl 38, adapted to engage said disk, substantially as described.

8. The combination, with the tilting and feed hoppers, of a shaft 27, provided with the fixed disk 31 and a tripping device, the power-wheel loosely arranged on said shaft and detachably engaging said disk, the loose gear 26, clutch mechanism between the same and said power-wheel, the crank-wheel 24, meshing with said gear 26, the link 21, pivotally connecting said hopper and crank-wheel, a yielding buffer 41, and the spring-catch 47, adapted to engage extensions on said wheel 24, substantially as and for the purpose specified.

JOSEPH DIETZ.

Witnesses:
J. A. SAWYER,
L. LARSON.